(12) United States Patent
Whitby-Strevens (10) Patent No.: US 8,392,742 B2
(45) Date of Patent: *Mar. 5, 2013

(54) CYCLEMASTER SYNCHRONIZATION IN A DISTRIBUTED BRIDGE

(75) Inventor: Colin Whitby-Strevens, Ben Lomond, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/190,387

(22) Filed: Jul. 25, 2011

(65) Prior Publication Data

US 2012/0023357 A1  Jan. 26, 2012

Related U.S. Application Data

(60) Continuation of application No. 11/820,657, filed on Jun. 19, 2007, now Pat. No. 7,987,381, which is a division of application No. 10/749,613, filed on Dec. 29, 2003, now Pat. No. 7,237,135.

(51) Int. Cl.
*G06F 1/04* (2006.01)
(52) U.S. Cl. .......... 713/401; 713/400; 370/503
(58) Field of Classification Search ............ 713/401, 713/400, 600; 370/503
See application file for complete search history.

(56) References Cited

U.S. PATENT DOCUMENTS

| | | | |
|---|---|---|---|
| 4,156,798 A | 5/1979 | Doelz | |
| 4,194,113 A | 3/1980 | Fulks et al. | |
| 5,014,262 A | 5/1991 | Harshavardhana | |
| 5,274,631 A | 12/1993 | Bhardwaj | |
| 5,321,812 A | 6/1994 | Benedict et al. | |
| 5,343,461 A | 8/1994 | Barton et al. | |
| 5,394,556 A | 2/1995 | Oprescu | |
| 5,406,643 A | 4/1995 | Burke et al. | |
| 5,452,330 A | 9/1995 | Goldstein | |
| 5,490,250 A | 2/1996 | Reschke et al. | |
| 5,490,253 A | 2/1996 | Laha et al. | |
| 5,495,481 A | 2/1996 | Duckwall | |
| 5,524,254 A | 6/1996 | Morgan et al. | |
| 5,539,390 A | 7/1996 | Nagano et al. | |
| 5,541,670 A | 7/1996 | Hanai | |
| 5,568,487 A | 10/1996 | Sitbon et al. | |
| 5,568,641 A | 10/1996 | Nelson et al. | |
| 5,583,922 A | 12/1996 | Davis et al. | |
| 5,621,659 A | 4/1997 | Matsumoto et al. | |

(Continued)

FOREIGN PATENT DOCUMENTS

| EP | 1 085 706 | 3/2001 |
|---|---|---|
| EP | 1 085 706 | 10/2002 |

OTHER PUBLICATIONS

Bregni et al., Jitter Testing Technique and Results at VC-4 Desynchronizer Output of SDH Equipment, IEEE International Conference on Communications, vol. 3, pp. 1407-1410, May 12, 1994.

(Continued)

*Primary Examiner* — Chun Cao
(74) *Attorney, Agent, or Firm* — Gazdzinski & Associates, PC (57) ABSTRACT

A method of synchronizing cyclemasters over a distributed bridge is disclosed. The method comprises: a local portal sending a synchronization signal to a peer portal through a bridge fabric upon occurrence of a cycle synchronization event on the local portal; the peer portal sampling its local cycle timer to obtain a sample value when the peer portal receives the synchronization signal; a bridge manager at an upstream portal communicating the sample value to a bridge manager at an alpha portal; the bridge manager at the alpha portal using the sampled time value to compensate for delays through a bridge fabric, calculate the correction to be applied to a cycle timer associated with the alpha portal, and correct the cycle timer.

18 Claims, 4 Drawing Sheets

U.S. PATENT DOCUMENTS

| | | | |
|---|---|---|---|
| 5,630,173 | A | 5/1997 | Oprescu |
| 5,632,016 | A | 5/1997 | Hoch et al. |
| 5,640,595 | A | 6/1997 | Baugher et al. |
| 5,642,515 | A | 6/1997 | Jones et al. |
| 5,654,657 | A | 8/1997 | Pearce |
| 5,684,715 | A | 11/1997 | Palmer |
| 5,701,476 | A | 12/1997 | Fenger |
| 5,701,492 | A | 12/1997 | Wadsworth et al. |
| 5,706,278 | A | 1/1998 | Robillard et al. |
| 5,712,834 | A | 1/1998 | Nagano et al. |
| 5,719,862 | A | 2/1998 | Lee et al. |
| 5,754,765 | A | 5/1998 | Danneels et al. |
| 5,764,930 | A | 6/1998 | Staats |
| 5,784,648 | A | 7/1998 | Duckwall |
| 5,802,048 | A | 9/1998 | Duckwall |
| 5,802,057 | A | 9/1998 | Duckwall et al. |
| 5,802,365 | A | 9/1998 | Kathail et al. |
| 5,805,073 | A | 9/1998 | Nagano et al. |
| 5,809,331 | A | 9/1998 | Staats et al. |
| 5,819,115 | A | 10/1998 | Hoese et al. |
| 5,822,571 | A * | 10/1998 | Goodrum et al. ............. 713/400 |
| 5,826,027 | A | 10/1998 | Pedersen et al. |
| 5,832,298 | A | 11/1998 | Sanchez et al. |
| 5,835,761 | A | 11/1998 | Ishii et al. |
| 5,845,152 | A | 12/1998 | Anderson et al. |
| 5,867,730 | A | 2/1999 | Leyda |
| 5,875,301 | A | 2/1999 | Duckwall et al. |
| 5,923,663 | A | 7/1999 | Bontemps et al. |
| 5,930,480 | A | 7/1999 | Staats |
| 5,935,208 | A | 8/1999 | Duckwall et al. |
| 5,938,764 | A | 8/1999 | Klein |
| 5,940,600 | A | 8/1999 | Staats et al. |
| 5,954,796 | A | 9/1999 | McCarty et al. |
| 5,968,152 | A | 10/1999 | Staats |
| 5,970,052 | A | 10/1999 | Lo et al. |
| 5,987,605 | A | 11/1999 | Hill et al. |
| 5,991,842 | A | 11/1999 | Takayama |
| 6,006,286 | A * | 12/1999 | Baker et al. ...................... 710/22 |
| 6,009,480 | A | 12/1999 | Pleso |
| 6,032,202 | A | 2/2000 | Lea et al. |
| 6,032,261 | A | 2/2000 | Hulyalkar |
| 6,038,234 | A | 3/2000 | LaFollette et al. |
| 6,038,625 | A | 3/2000 | Ogino et al. |
| 6,070,187 | A | 5/2000 | Subramaniam et al. |
| 6,073,206 | A | 6/2000 | Piwonka et al. |
| 6,091,726 | A | 7/2000 | Crivellari et al. |
| 6,115,764 | A | 9/2000 | Chisholm et al. |
| 6,122,248 | A | 9/2000 | Murakoshi et al. |
| 6,128,318 | A * | 10/2000 | Sato ............................... 370/503 |
| 6,131,129 | A | 10/2000 | Ludtke et al. |
| 6,131,134 | A | 10/2000 | Huang et al. |
| 6,131,163 | A | 10/2000 | Wiegel |
| 6,133,938 | A | 10/2000 | James |
| 6,138,196 | A | 10/2000 | Takayama et al. |
| 6,141,702 | A | 10/2000 | Ludtke et al. |
| 6,141,767 | A | 10/2000 | Hu et al. |
| 6,145,018 | A | 11/2000 | LaFollette et al. |
| 6,157,972 | A | 12/2000 | Newman et al. |
| 6,160,796 | A | 12/2000 | Zou |
| 6,167,532 | A | 12/2000 | Wisecup |
| 6,173,327 | B1 | 1/2001 | De Borst et al. |
| 6,192,189 | B1 | 2/2001 | Fujinami et al. |
| 6,199,119 | B1 | 3/2001 | Duckwall et al. |
| 6,202,210 | B1 | 3/2001 | Ludtke |
| 6,212,171 | B1 | 4/2001 | LaFollette et al. |
| 6,212,633 | B1 | 4/2001 | Levy et al. |
| 6,219,697 | B1 | 4/2001 | Lawande et al. |
| 6,226,680 | B1 | 5/2001 | Boucher et al. |
| 6,233,615 | B1 | 5/2001 | Van Loo |
| 6,233,624 | B1 | 5/2001 | Hyder et al. |
| 6,243,778 | B1 | 6/2001 | Fung et al. |
| 6,247,063 | B1 | 6/2001 | Ichimi et al. |
| 6,247,083 | B1 | 6/2001 | Hake et al. |
| 6,253,114 | B1 | 6/2001 | Takihara |
| 6,253,225 | B1 | 6/2001 | Hyder et al. |
| 6,256,059 | B1 | 7/2001 | Fichtner |
| 6,260,063 | B1 | 7/2001 | Ludtke et al. |
| 6,266,334 | B1 | 7/2001 | Duckwall |
| 6,266,344 | B1 | 7/2001 | Fujimori et al. |
| 6,266,701 | B1 | 7/2001 | Sridhar et al. |
| 6,275,889 | B1 | 8/2001 | Saito |
| 6,282,597 | B1 | 8/2001 | Kawamura |
| 6,292,840 | B1 | 9/2001 | Blomfield Brown et al. |
| 6,295,479 | B1 | 9/2001 | Shima et al. |
| 6,308,222 | B1 | 10/2001 | Krueger et al. |
| 6,311,228 | B1 | 10/2001 | Ray |
| 6,314,461 | B2 | 11/2001 | Duckwall et al. |
| 6,333,938 | B1 * | 12/2001 | Baker ........................... 370/503 |
| 6,343,321 | B2 | 1/2002 | Patki et al. |
| 6,345,315 | B1 | 2/2002 | Mishra |
| 6,347,362 | B1 | 2/2002 | Schoinas et al. |
| 6,353,868 | B1 | 3/2002 | Takayama et al. |
| 6,356,558 | B1 | 3/2002 | Hauck et al. |
| 6,363,085 | B1 | 3/2002 | Samuels |
| 6,373,821 | B2 | 4/2002 | Staats |
| 6,385,679 | B1 | 5/2002 | Duckwall et al. |
| 6,405,247 | B1 | 6/2002 | Lawande et al. |
| 6,411,628 | B1 | 6/2002 | Hauck et al. |
| 6,418,150 | B1 | 7/2002 | Staats |
| 6,425,019 | B1 | 7/2002 | Tateyama et al. |
| 6,426,962 | B1 | 7/2002 | Cabezas et al. |
| 6,442,630 | B1 | 8/2002 | Takayama et al. |
| 6,445,711 | B1 | 9/2002 | Scheel et al. |
| 6,446,116 | B1 | 9/2002 | Burridge |
| 6,446,142 | B1 | 9/2002 | Shima et al. |
| 6,452,975 | B1 | 9/2002 | Hannah |
| 6,457,086 | B1 | 9/2002 | Duckwall |
| 6,466,982 | B1 | 10/2002 | Ruberg |
| 6,496,862 | B1 | 12/2002 | Akatsu et al. |
| 6,502,144 | B1 | 12/2002 | Accarie |
| 6,513,085 | B1 | 1/2003 | Gugel et al. |
| 6,519,657 | B1 | 2/2003 | Stone et al. |
| 6,529,522 | B1 | 3/2003 | Ito et al. |
| 6,567,876 | B1 * | 5/2003 | Stufflebeam ................... 710/303 |
| 6,574,588 | B1 | 6/2003 | Shapiro et al. |
| 6,587,904 | B1 | 7/2003 | Hauck et al. |
| 6,591,300 | B1 | 7/2003 | Yurkovic |
| 6,606,320 | B1 | 8/2003 | Nomura et al. |
| 6,618,750 | B1 | 9/2003 | Staats |
| 6,618,785 | B1 | 9/2003 | Whitby-Streves |
| 6,621,832 | B2 * | 9/2003 | Staats ........................... 370/503 |
| 6,628,607 | B1 | 9/2003 | Hauck et al. |
| 6,631,426 | B1 | 10/2003 | Staats |
| 6,636,914 | B1 | 10/2003 | Teener |
| 6,639,918 | B1 | 10/2003 | Hauck et al. |
| 6,643,714 | B1 | 11/2003 | Chrysanthakopoulos |
| 6,671,768 | B1 | 12/2003 | Brown |
| 6,686,838 | B1 | 2/2004 | Rezvani et al. |
| 6,691,096 | B1 | 2/2004 | Staats |
| 6,718,497 | B1 | 4/2004 | Whitby-Strevens |
| 6,879,602 | B1 * | 4/2005 | Sugita et al. ................... 370/503 |
| 6,954,467 | B1 * | 10/2005 | Hillier et al. ................... 370/466 |
| 7,237,135 | B1 * | 6/2007 | Whitby-Strevens .......... 713/401 |
| 7,987,381 | B2 * | 7/2011 | Whitby-Strevens .......... 713/401 |
| 2001/0001151 | A1 | 5/2001 | Duckwall et al. |
| 2001/0019561 | A1 | 9/2001 | Staats |
| 2001/0024423 | A1 | 9/2001 | Duckwall et al. |
| 2002/0057655 | A1 | 5/2002 | Staats |
| 2002/0085581 | A1 | 7/2002 | Hauck et al. |
| 2002/0101231 | A1 | 8/2002 | Staats |
| 2002/0103947 | A1 | 8/2002 | Duckwall et al. |
| 2002/0172226 | A1 | 11/2002 | Staats |
| 2002/0188780 | A1 | 12/2002 | Duckwall |
| 2002/0188783 | A1 | 12/2002 | Duckwall et al. |
| 2003/0037161 | A1 | 2/2003 | Duckwall et al. |
| 2003/0055999 | A1 | 3/2003 | Duckwall et al. |
| 2004/0037309 | A1 | 2/2004 | Hauck et al. |

OTHER PUBLICATIONS

"Information technology—Microprocessor systems—Control and Status Registers (CSR) Architecture for microcomputer buses", ANSI/IEEE Standard 1212, The Institute of Electrical and Electronics Engineers, Inc. pp. 1-122, 1994 Edition.

Bregni et al., Jitter Testing Technique and Results at VC-4 Desynchronizer Output of SDH Equipment, IEEE Transactions on Instrumentation and Measurement, vol. 44, Issue 3, pp. 675-678, Jun. 1995.

"IEEE Standard for a High Performance Serial Bus", IEEE Standard 1394-1995. Institute of Electrical and Electronics Engineers, Inc., pp. 1-384, approved Jul. 22, 1996.

Shiwen et al., Parallel Positive Justification in SDH C.sub.-4 Mapping, IEEE International Conference on Communications, vol. 3, pp. 1577-1581, Jun. 12, 1997.

"AV/C Digital Interface Command Set General Specification, Rev. 3.0", 1394 Trade Association, pp. 4-5, 20-34, Apr. 15, 1998.

"Enhancements to the AV/C General Specification 3.0 Version 1.0FC1", 1394 Trade Association, pp. 4, 6-17, Nov. 5, 1998.

"Information Technology—Fibre Channel-Methodologies for Jitter Specification", NCITS TR-25-1999, Jitter Working Group Technical Report, Rev. 10, pp. 1-96, Jun. 9, 1999.

"P1394a Draft Standard for a High Performance Serial Bus (Supplement)", Draft 3.0, Institute of Electrical and Electronics Engineers, Inc., pp. 1-187, Jun. 30, 1999.

"IEEE Standard for a High Performance Serial Bus—Amendment I", Institute of Electrical and Electronics Engineers, Inc., pp. 1-196, approved Mar. 30, 2000.

P1394b IEEE Draft Standard for a High Performance Serial Bus (High Speed Supplement) P1394b Draft 1.3.3, Institute of Electrical and Electronics Engineers, Inc., pp, 1-408, Nov. 16, 2001.

"IEEE Standard for a High Performance Serial Bus—Amendment 2", Institute of Electrical and Electronics Engineers, Inc., pp. 1-369, 2002 (no month).

* cited by examiner

FIG. 6 ated CYCLEMASTER SYNCHRONIZATION IN A DISTRIBUTED BRIDGE

PRIORITY

This application is a continuation of and claims priority to co-owned U.S. patent application Ser. No. 11/820,657 of the same title filed Jun. 19, 2007 now U.S. Pat. No. 7,987,381, which is a divisional of and claims priority to co-owned U.S. patent application Ser. No. 10/749,613 of the same title filed Dec. 29, 2003 (now issued as U.S. Pat. No. 7,237,135), each of the foregoing incorporated herein by reference in its entirety.

FIELD OF THE INVENTION

The present invention relates broadly to synchronizing devices in communication with each other over a serial bus connection. Specifically, the present invention relates to synchronizing cyclemasters across a distributed bridge architecture in a IEEE 1394-compliant network.

BACKGROUND OF THE INVENTION

The Institute of Electrical and Electronic Engineers (IEEE) has promulgated a number of versions of a high speed serial bus protocol falling under the IEEE 1394 standard (referred to herein collectively as "1394"). A typical serial bus having a1394 architecture interconnects multiple node devices via point-to-point links, such as cables, each connecting a single node on the serial bus to another node on the serial bus. Data packets are propagated throughout the serial bus using a number of point-to-point transactions, such that a node that receives a packet from another node via a first point-to-point link retransmits the received packet via other point-to-point links. A tree network configuration and associated packet handling protocol ensures that each node receives every packet once. The 1394-compliant serial bus may be used as an alternate bus for the parallel backplane of a computer system, as a low cost peripheral bus, or as a bus bridge between architecturally compatible buses.

The 1394 standard specifies two primary types of bus access: asynchronous access and isochronous access. Asynchronous access may be described as either "fair" or "priority." Priority access is used by nodes that need the next available asynchronous opportunity to transfer data. Isochronous access is used by nodes that require guaranteed bandwidth with bounded latency, for example, nodes transmitting video or audio data. The transactions for each type of bus access are comprised of at least one subaction, wherein a subaction is a complete one-way transfer operation.

In the case of digital video data transfers within 1394-compliant systems, the video data may be transferred between a mass storage device and a digital video camera or other recorder under the control of a computer processor or other device. The video data is transferred as a series of frames, each frame being made up of a number of data packets. The individual data packets include a number header fields as well as the video data itself. In order to ensure that each frame of the video data is played out in the proper sequence, the frames are time stamped with an appropriate frame presentation time measured in terms of cycle time of an isochronous transaction on a 1394-compliant bus when they are recorded. The cycle time is maintained by a cyclemaster as described in the 1394 standard. The cyclemaster uses priority access to broadcast a cycle start packet. This initiates an isochronous cycle, during which nodes can use isochronous access, and contains the cyclemaster's cycle time clock information so that all nodes associated maintain the necessary synchronization for audio and video data.

Figure 1:
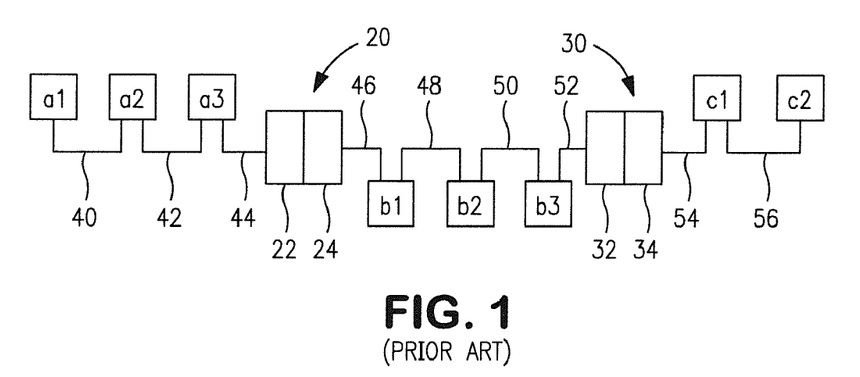
FIG. 1 illustrates in block diagram form a 1394-compliant network of buses connected by bridges.

Bus bridges between multiple buses of devices forward request and response subactions from one bus to another, allowing transaction requester and responder components to be located on different buses. Each bus has its own cyclemaster. An exemplary 1394-compliant network of three buses of devices is illustrated in FIG. 1. The first bus includes devices a1, a2, and a3 coupled together by 1394-compliant cables. Specifically, device a1 is coupled to device a2 by cable 40. Device a2 is coupled to device a3 by cable 42. Device a3 is then coupled to portal 22 of bridge 20. Bridge 20 couples the first bus to a second bus, which includes the devices h1, b2 and b3. Portal 24 of bridge 20 is coupled to device bi by cable 46. Device bi is coupled to device b2 by cable 48. Device bi is coupled to device b2 by cable 48. Device b2 is coupled to device b3 by cable 50. Device b3 is coupled to portal 32 of bridge 30. Bridge 30 couples the second bus to a third bus that includes the devices c1 and c2. A second portal 34 of bridge 30 is coupled to device c1 by cable 54. Device c1 is coupled to device c2 by cable 56. Bridges 20 and 30 allow devices on the different buses to communicate with each other using both asynchronous and isochronous communications. For example, if device a1 sends a communication to device b3, the communication is passed along the first bus until it reaches portal 22 of bridge 20. Bridge 20 then recognizes that the communication is addressed to the device b3 and forwards the communication from portal 22 to portal 24.

Figure 2:
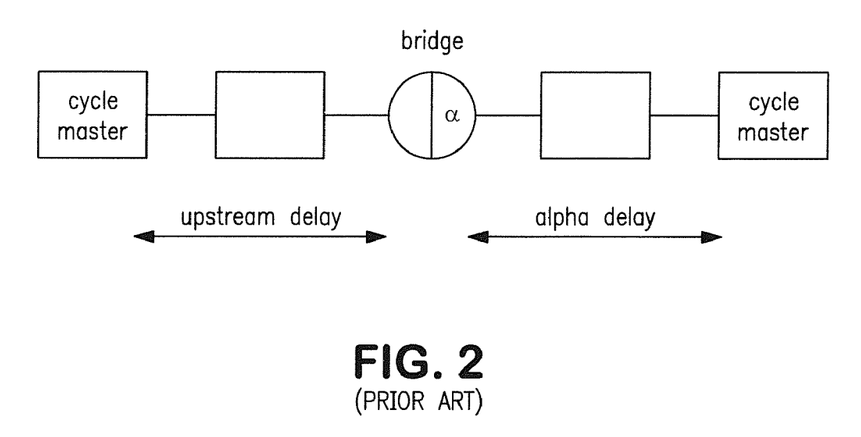
FIG. 2 illustrates a bridge connecting buses having separate cyclemasters.

The 1394 standard requires that 1394 bridges implement a method by which all the cyclemasters in a network are kept in phase. The topology used to model the method is shown in FIG. 2. One cycle master is elected to be the master or net cyclemaster. Cyclemasters on buses directly attached to the bus with the net cycle master are kept in phase with the net cycle master. In turn, other buses attached to these buses are kept in phase with the cycle masters on these buses, and so on. Each bridge is responsible for calculating the amount by which the cyclemaster on the bus on its alpha portal (the portal away from the net cyclemaste;s out of phase with the cyclemaster on the bus on its other portal, and accordingly issuing cyclemaster adjustment commands to the cyclemaster on its alpha portal to shorten or lengthen the cycle by one cycle_offset unit (40 ns). According to the method of the 1394 standard, the phase difference is sampled once during each isochronous period. The bridge simultaneously samples the value of CYCLE_TIME.cycle_offset for both of its portals and subtracts, modulus 3072, the upstream portal's cycle offset from the alpha portal's cycle offset.

Figure 3:
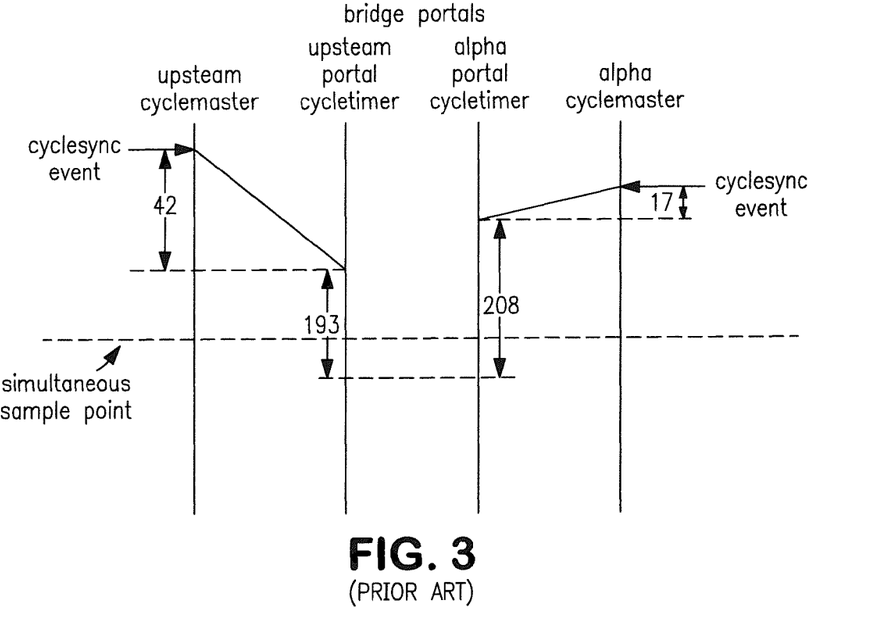
FIG. 3 is a timing diagram that illustrates how cyclemaster synchronization is performed in accordance with prior art 1394 methods.

FIG. 3 illustrates how the delay from the cyclemasters to the respective portals is considered by the 1394 standard method. The two cycle timers connected to the bridge provide, when simultaneously sampled, CYCLE_TIME, cycle_offset values denoted as upstreamOffset and alphaOffset respectively. In the example illustrated in FIG. 3, the upstream delay is 42 units, and the alpha delay is 17 units (as per the example in section 4.4 of the IEEE Serial Bus Protocol 1394.1). When the two cycle timers are simultaneously sampled, the correction to be applied to the alpha cyclemaster is $(208+17)-(193+42)=-10$. This negative value is interpreted as a "go faster" command, which causes the alpha cyclemaster to wrap at 3070 instead of 3071. The expectation is that on the next isochronous cycle, the difference will then be $-9$, and the method eventually brings the difference to a zero value.

However, in a distributed bridge, where the two portals are connected by a long haul or wireless medium, there may be no common clock to be sampled by the cycle timers simultaneously, so the method taught by the 1394 standard is useless. It is now desirable to attach devices by wireless connections to 1394 buses, as well as by significantly longer cable lengths. Thus, there is a heartfelt need to provide synchronization of cyclemasters that facilitate connecting wireless or longhaul connections.

SUMMARY

The present invention addresses the problem of wireless or longhaul connections and provides cyclemaster synchronization over a distributed bridge. In a distributed bridge, when a cycle synchronization event occurs on a portal, such as when the cycle_offset rolls over, the portal sends a synchronization signal to its peer portal through the bridge fabric. When the peer portal receives such a synchronization signal it samples the local cycle timer. The bridge management software at the upstream portal communicates the sample value to the bridge management software at the alpha portal. The bridge management software at the alpha portal is then able to use the sampled time values to compensate for the delays through the bridge fabric, and calculate the correction to be applied to the alpha cycle timer. Embodiments of the present invention assume that the delay through the bridge fabric is constant, and the same in both directions.

In one aspect, the present invention provides a method of synchronizing cyclemasters over a distributed bridge. A local portal sends a synchronization signal to a peer portal through a bridge fabric upon occurrence of a cycle synchronization event on the local portal. The peer portal samples its local cycle timer to obtain a sample value when the peer portal receives the synchronization signal. A bridge manager at an upstream portal communicates the sample value to a bridge manager at an alpha portal. The bridge manager at the alpha portal uses the sampled time value to compensate for delays through a bridge fabric, calculate the correction to be applied to a cycle timer associated with the alpha portal, and correct the cycle timer. In an embodiment, the cycle synchronization event comprises a cycle offset value rolling over.

In another aspect, the present invention provides alternative method of synchronizing cyclemasters over a distributed bridge. An output signal means from a first portal is connected with an input signal means of a second portal and an output signal means from a second portal is connected with an input signal means of a first portal. The output signal means of the first portal is sampled and stored. The sampled value is communicated to a downstream portal. The downstream portal adjusts its cyclemaster in response to the sampled value. In an embodiment, an interrupt is generated when the output signal means is sampled.

In yet another embodiment, the present invention provides a method of synchronizing cyclemasters over a distributed bridge, by performing the acts of connecting an output signal means from a first portal with an input signal means of a second portal and connecting an output signal means from a second portal with an input signal means of a first portal; sampling the output signal means of the first portal and storing the sampled value; communicating the sampled value to a downstream portal; if the sampled value is received by the downstream portal within an acceptable time period, the downstream portal adjusting its cyclemaster in response to the sampled value; and if the sampled value is not received within an acceptable time period, then communicating an error condition that indicates that cyclemaster adjustment cannot be performed. In an embodiment, cyclemaster adjustment is abandoned for a current isochronous cycle if the sampled value is not received within an acceptable time period. In an embodiment, the error condition is indicated by a bridge fabric connecting the first and second portals, and can be indicated by setting error flags.

In still another embodiment, the present invention provides a bridge link device, connectable within a 1394-compliant serial bus architecture. The bridge link device comprises a first sampled value reflecting an output signal value; and a second sampled value reflecting an input signal value; a sample value register, the sample value register containing the first sampled value and the second sampled value, the sample value register in communication with software that communicates the sampled values to a downstream node device.

Many other features and advantages of the present invention will be realized upon reading the following detailed description, when considered in conjunction with the accompanying drawings, in which:

DETAILED DESCRIPTION

Embodiments of the present invention utilize the following calculations. al_co represents the alpha portal cycle offset at any moment in time. up_co represents the upstream portal cycle offset at any moment in time. d represents the real difference between the two cycle offset values (al_co−up_co). For the time period covered by the sampling time of the algorithm, d is assumed constant, and represents the difference between the "simultaneous sample" values as expressed in the 1394.1 algorithm. fd represents the fabric delay (assumed constant and the same in both directions). up_co' represents the sampled value of the upstream portal cycle offset when the sampling signal is received from the alpha portal. Then, $$up\_co' = d + fd \qquad (1)$$

aI_co represents the sampled value of the alpha portal cycle offset when the sampling signal is received from the upstream portal. Then, $$aLco = -d + fd \qquad (2)$$

Subtracting (1) from (2) eliminates the fabric delay $$aLco - up\_co' = -d + fd - (d + fd) = -2d \qquad (3)$$

$$\text{Hence } d = -(aI\_co - up\_co')/2 \qquad (4)$$

Figure 4:
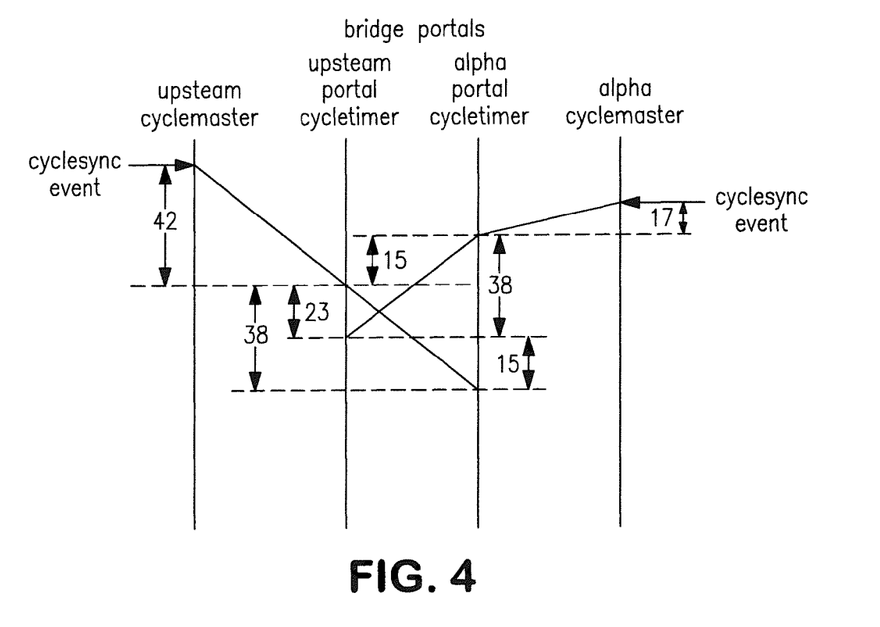
FIG. 4 is a timing diagram that illustrates how cyclemaster synchronization in a distributed bridge is performed in accordance with the present invention.

FIG. 4 illustrates the application of formulae (1)-(4), where d=−15, and fd=38. In this embodiment, the upstream portal samples the value 23 when it receives the sampling signal from the alpha portal, and communicates this value to the alpha portal. The alpha portal samples the value 53 when it receives the sampling signal from the upstream portal. When it receives the value 23 from the upstream portal, the difference is calculated as −(23−53)/2=15. In a preferred embodiment, the arithmetic is performed modulo 3072. The isochronous cycle repeats on a nominal 8 Kz clock (125 usec). The cyclemaster clock is itself a 25 Mhz clock. 3072 ticks of this clock measures 125 microseconds. Thus in normal cyclemaster behavior when the cycle offset reaches 3072, a new isochronous cycle is started and the cycle offset reset to zero.

Figure 5:
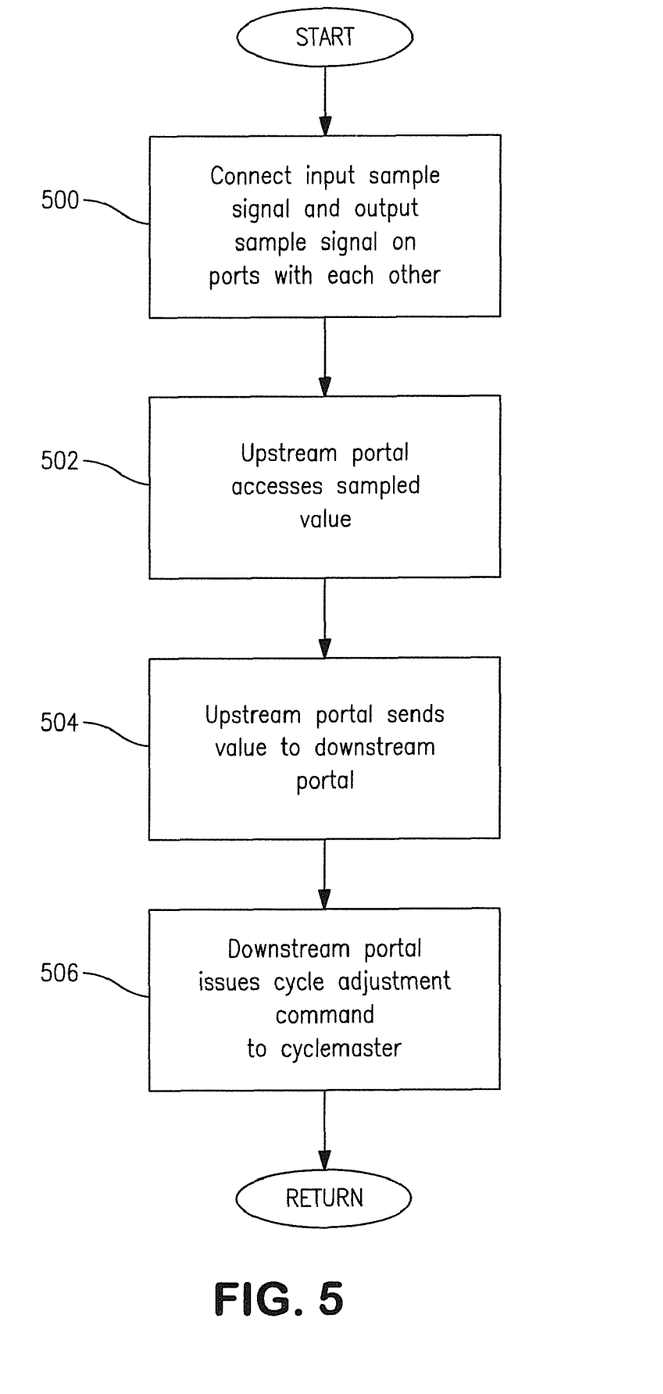
FIG. 5 is a flowchart illustrating a sequence of acts executed in accordance with an embodiment of the present invention.

In an embodiment of the present invention, bridge link hardware incorporates an output sample signal, an input sample signal, and a software readable register for storing the sampled values. Directing attention to FIG. 5, the bridge link fabric connects the four signals (output from one portal to the input of the other portal and vice versa) with a constant delay (act 500). Jitter on the delay is bounded by 20 ns-40 ns, preferably closer to 20 ns. The value of the delay is immaterial, except that the sampled value is subsequently accessed by software in the upstream portal (act 502) and communicated to the downstream portal (act 504) in sufficient time for the downstream portal to issue the cycle adjustment command to the cyclemaster (act 504). In the preferred embodiment, the bridge portal hardware also generates an interrupt signal when it takes a sample, and so is ready for software to read the sample and either send it to the alpha portal. (upstream portal) or perform the cycle adjustment calculation (alpha portal). An indication, such as error flag, is made by the bridge fabric if either of the sampled signals is not delivered on time. Software uses the indication to abandon cyclemaster adjustment for the current isochronous cycle. Leaving the cyclemaster unadjusted is not problematic if error indications occur rarely. Alternatively, a double-sample scheme similar to the one described below may be used to provide redundancy.

Figure 6:
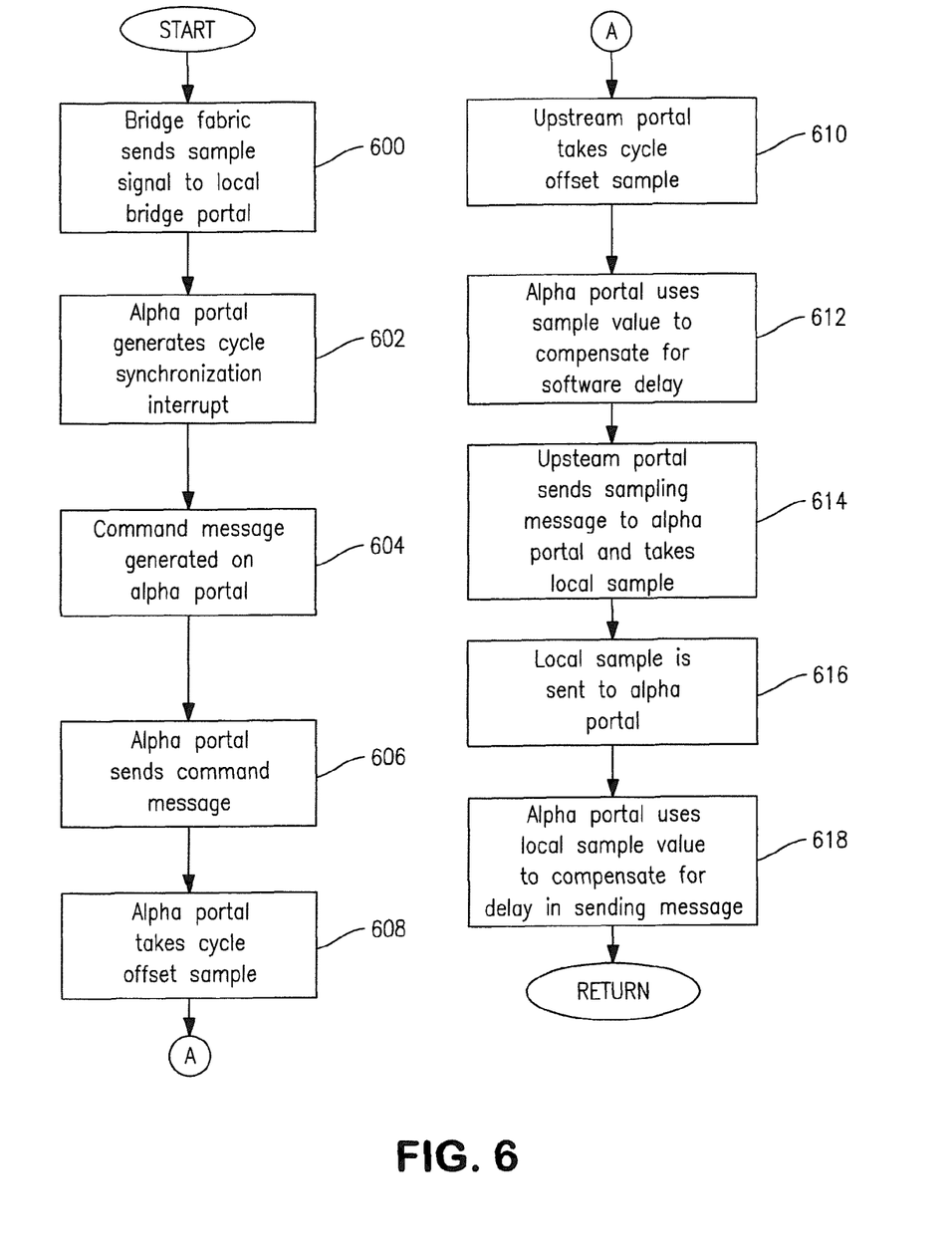
FIG. 6 is a flowchart illustrating a sequence of acts executed in accordance with another embodiment of the present invention.

In another embodiment of the present invention, a combined hardware and software implementation can be utilized to provide synchronization of cyclemasters over a distributed bridge. Directing attention to FIG. 6, in this embodiment, the portals have two sample inputs and two registers. The bridge fabric sends sampling signals (act 600) to the local bridge portal at the moment that a message is launched across the bridge fabric and at the moment that a message arrives from the bridge fabric. These signals are used to trigger the sampling mechanisms in the bridge. The alpha portal generates a cycle synchronization interrupt to the local bridge management software (act 602). This queues an appropriate command message to send to its peer across the bridge fabric (act 604). At the moment that the message is launched (act 606), the bridge fabric hardware triggers a cycle_offset sample in the alpha portal bridge hardware (act 608). At the moment that the message arrives at the upstream portal, the bridge fabric hardware triggers the cycle_offset sample in the upstream portal (act 610). The alpha portal uses the local sample to compensate for the software delay in sending the sampling message (act 612). Similarly, the upstream portal takes a local sample at the moment that it sends its sampling message to the alpha portal (act 614). Software in the upstream portal subsequently communicates this value to the software in the alpha portal (act 616), so that software in the alpha portal can compensate for the software delay in the upstream portal in sending the sampling message to the alpha portal (act 618). At this point, the alpha portal now has enough information to determine whether an adjustment to the cyclemaster on its local bus is necessary, and if so cotnmand that adjustment. The signals used by the bridge fabric hardware can be readily derived from existing signals. For example, the sampling signal on message arrival can be the same signal as is used to generate an interrupt. Care needs to be taken that the samples are not overwritten by subsequent message transmissions/arrivals before they have been read by software. However, taking samples, for example, on every message, regardless of whether the message is a sampling message or not, is relatively safe. If a message transmission fails for some reason, then it can be retried. In a preferred embodiment, a polling scheme performs the retries and sets a flag when message transmission is complete. If the bridge fabric supports automatic retries, which may affect delivery latency, then the sampling signal for transmit is reasserted.

While embodiments of methods and apparatus for synchronizing cyclemasters over distributed bridges has been illustrated and described, it is to be understood that many variations can be made to embodiments of the present invention, without departing from the spirit thereof.

What is claimed is:

1. In a 1394-compliant system of node devices in communication over a distributed bridge, a method of synchronizing cyclemasters over a distributed bridge, the method comprising:
    connecting an output signal means from a first portal with an input signal means of a second portal and connecting an output signal means from the second portal with an input signal means of the first portal;
    sampling the output signal means of the first portal and storing a sampled value;
    communicating the sampled value to a downstream portal;
    if the sampled value is received by the downstream portal within an acceptable time period, the downstream portal adjusting its cyclemaster in response to the sampled value; and
    if the sampled value is not received within the acceptable time period then communicating an error condition that indicates that cyclemaster adjustment cannot be performed.

2. The method of claim 1, wherein cyclemaster adjustment is abandoned for a current isochronous cycle if the sampled value is not received within the acceptable time period.

3. The method of claim 1, wherein the error condition is indicated by a bridge fabric connecting the first and second portals.

4. The method of claim 1, wherein the error condition is indicated by setting error flags.

5. A method of operating a computerized system, comprising:
    receiving a cycle synchronization event at a local portal;
    sending a synchronization signal from the local portal via a bridge to a peer portal;
    accessing a local cycle timer associated with the peer portal, and obtaining a value based at least in part thereon;
    sending the value to a third portal; and
    indicating an error if the value was not received by the third portal within a first time period.

6. The method of claim 5, wherein the error is indicated by at least one error flag.

7. The method of claim 5, wherein the cycle synchronization event comprises a cycle offset value rolling over.

8. The method of claim 5, wherein the third portal comprises an alpha portal, and at least a portion of the computerized system is compliant with IEEE Std. 1394.

9. A node device adapted for use with a bridge fabric, comprising:
    a portal comprising a cycle clock; and
    logic configured to receive a clock adjustment command;

logic configured to adjust the cycle clock if the received clock adjustment command is received within an acceptable time period; and logic configured to communicate an error condition indicating that cycle adjustment cannot be performed if the received clock adjustment command is not received within the acceptable time period.

10. The node device of claim 9, where the cycle clock maintains an isochronous cycle time.

11. The node device of claim 9, further comprising logic configured to communicate the cycle adjustment to another peer node device, via the bridge fabric.

12. The node device of claim 9, wherein the error condition is communicated using a flag.

13. The node device of claim 9, further comprising logic configured to generate a master clock adjustment command.

14. The node device of claim 13, further comprising logic configured to communicate the master clock adjustment command to another peer node device, via the bridge fabric.

15. A computer-readable storage apparatus, comprising:
a non-transitory storage medium having at least one computer program stored thereon, the at least one program being configured to, when executed:
receive a cycle synchronization event at a local portal;
send a synchronization signal from the local portal via a bridge to a peer portal;
access a local cycle timer associated with the peer portal, and obtain a value based at least in part thereon;
send the value to a third portal; and
indicate an error if the value was not received by the third portal within a first time period.

16. The computer-readable storage apparatus of claim 15, wherein the error is indicated by at least one error flag.

17. The computer-readable storage apparatus of claim 15, wherein the cycle synchronization event comprises a cycle offset value rolling over.

18. The computer-readable storage apparatus of claim 15, wherein the third portal comprises an alpha portal, and at least a portion of the computerized system is compliant with IEEE Std. 1394.

* * * * *